United States Patent

[11] 3,574,320

| [72] | Inventor | Donald F. Sigmund |
| | | Anamosa, Iowa 52205 |
| [21] | Appl. No. | 824,846 |
| [22] | Filed | May 15, 1969 |
| [45] | Patented | Apr. 13, 1971 |

[54] MULCHER BAR ASSEMBLY
7 Claims, 4 Drawing Figs.

[52] U.S. Cl.................................................... 172/202,
172/693, 172/710
[51] Int. Cl...................................................A01b, 49/02
A01b 23/04
[50] Field of Search........................................... 172/197-
—203, 710, 741, 691

[56] References Cited
UNITED STATES PATENTS

| 924,993 | 6/1909 | Johnson | 172/691 |
| 1,213,553 | 1/1917 | Swainson | 172/202X |
| 2,234,351 | 3/1941 | Perosa | 172/202X |
| 2,736,252 | 2/1956 | Latshaw | 172/198X |
| 2,994,388 | 8/1961 | Ryan | 172/198X |
| 3,049,183 | 8/1962 | Birkenbach et al. | 172/691 |
| 3,100,018 | 8/1963 | Sokolowski | 172/741X |
| 3,294,180 | 12/1966 | Bergmann et al. | (172/202UX) |
| 3,500,936 | 3/1970 | Vigen | 172/198 |

Primary Examiner—Robert E. Bagwill
Attorney—Zarley, Mc Kee & Thomte

ABSTRACT: A mulcher bar assembly adapted for use with a plow and designed to trail the plow to mulch the freshly turned soil. A first pair of spaced apart arms are adjustably secured to the main plow beam and extend rearwardly and laterally therefrom. A second pair of spring loaded arms are pivotally and vertically adjustably secured at their upper ends to a first pair of arms and extend downwardly therefrom. A horizontal bar means is adjustably secured to the lower ends of the second pair of arms and has a plurality of spaced apart teeth extending downwardly therefrom. The spring loaded arms yieldably urge the teeth into the soil to mulch the soil as the plow is moved in the field. The second pair of arms, bar and teeth may pivot upwardly and rearwardly as a unit if a foreign object is struck by the teeth to prevent damage to the assembly and plow.

INVENTOR
DONALD F. SIGMUND
BY
Zarley, McKee & Thomte
ATTORNEYS

MULCHER BAR ASSEMBLY

Many attempts have been made previously to condition the soil after the same has been plowed. Attempts have been made to trail a harrow or drag behind the plow to pulverize the large clumps of soil which commonly appear in plowed soil. The conventional devices do not provide a means for varying the depth of penetration of the devices nor do the conventional devices satisfactorily condition the soil. Further, the existing devices are not universally adaptable for the various types of plows that are being produced.

Therefore, it is a principal object of this invention to provide a mulcher bar assembly for plows.

A further object of this invention is to provide a mulcher bar assembly which may be secured to substantially all of the various types and makes of plows.

A further object of this invention is to provide a mulcher bar assembly which is adapted to be adjustably secured to a plow.

A further object of this invention is to provide a mulcher bar assembly including a spring means connected thereto so that sufficient pressure may be exerted on the mulcher bar for greater depth of penetration.

A further object of this invention is to provide a mulcher bar assembly including adjustable spring means to obtain the necessary working depth or penetration.

A further object of this invention is to provide a mulcher bar assembly which is vertically adjustable for depth.

A further object of this invention is to provide a mulcher bar assembly which is vertically adjustable so that the assembly may overcome varying heights of different makes of plows.

A further object of this invention is to provide a mulcher bar assembly including a plurality of teeth secured to a bar, the teeth slicing through the furrows at approximately a 45° angle.

A further object of this invention is to provide a mulcher bar assembly which may pivot upwardly and rearwardly with respect to the plow in the event that a foreign object is struck to prevent damage to the plow and assembly.

A further object of this invention is to provide a mulcher bar assembly which is economical of manufacture, durable in use and refined in appearance.

These and other objects will be apparent to those skilled in the art.

This invention consists in the construction, arrangements, and combination of the various parts of the device, whereby the objects contemplated are attained as hereinafter more fully set forth, specifically pointed out in the claims, and illustrated in the accompanying drawings in which:

Figures 1, 2, 3, 4:
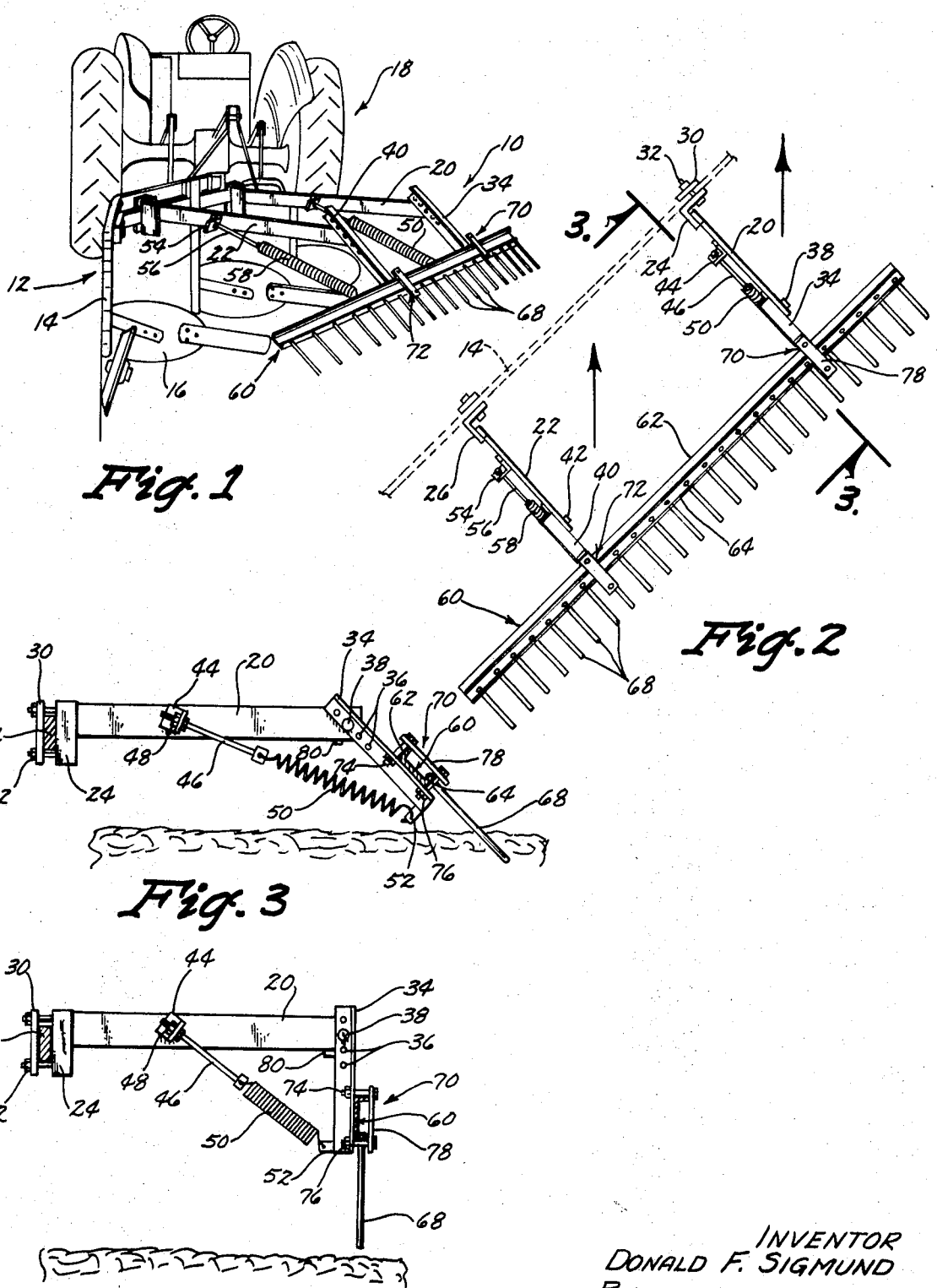
FIG. 1 is a rear view of the mulcher bar assembly attached to a conventional plow.
FIG. 2 is a top view of the mulcher bar assembly of this invention, the broken lines indicating the main plow beam.
FIG. 3 is a sectional view as seen along lines 3—3 of FIG. 2 and illustrating the teeth thereof in a ground engaging condition.
FIG. 4 is a view similar to FIG. 3 except that the assembly is illustrated in its normal inoperative position.

The mulcher bar assembly of this invention is generally designated by the reference numeral 10 and is adapted to be secured to a plow 12 including a main plow beam 14 and a plurality of plow bottoms 16. The plow 12 is connected to a conventional tractor 18 in the usual manner.

Assembly 10 includes a pair of support arms 20 and 22 having vertically disposed angles 24 and 26 secured to their forward ends respectively by welding or the like. Angle 24 is secured to the main plow beam 14 by means of a pair of bolts 28 extending therethrough and being received by a plate 30 on the forward side of the beam 14. Nuts 32 maintain the beam 14 between the rearward face of plate 30 and the forward face of angle 24 as best illustrated in FIG. 3. Angle 26 is secured to the plow beam 14 in the manner in which angle 24 is secured to beam 14. The beam 14 is disposed at a 45° angle with respect to the direction of travel of the plow and the support arms 20 and 22 extend horizontally rearwardly and outwardly therefrom in a parallel spaced apart condition.

A support arm 34 having a plurality of openings 36 formed therein at its upper end is pivotally secured to the rearward end of support arm 20 by means of a bolt 38 extending through one of the openings 36 and through the rearward end of the support arm 20. Support arm 40 is identical to support arm 34 and is pivotally secured to the rearward end of support arm 22 by a bolt 42. Angle bracket 44 is secured to support arm 20 by welding or the like as illustrated in FIG. 3 and has a bolt means 46 longitudinally adjustably extending therethrough as also illustrated in FIG. 3. A nut 48 is threadably mounted on the bolt 48 forwardly of the angle bracket 44 to achieve the longitudinal adjustment of the bolt 46 with respect to the angle bracket 44. A compression spring 50 is secured at its forward end to the rearward end of bolt 46 and is secured at its rearward end to an ear member 52 which is secured to the lower end of support arm 34 and which extends forwardly therefrom.

Angle bracket 54 is secured to support arm 22 and has a bolt means 56 longitudinally adjustably extending therethrough as illustrated in FIGS. 1 and 2. Spring means 58 is secured at its forward end to the rearward end of bolt 56 and is secured at its rearward end to the lower end of support arm 40 in a manner identical to which spring means 50 is secured to support arm 34.

The numeral 60 refers to an elongated channel including upper and lower flanges 62 and 64 respectively which are joined by a base portion 66. Lower flange 64 has a plurality of spaced apart openings formed therein along the length thereof. A tooth 68 is received in each of the openings in the lower flange 64 and is secured to the channel 60 by welding the upper end of the tooth to the lower flange 64. The channel or bar 60 is longitudinally adjustably secured to the support arms 34 and 40 adjacent the lower rearward ends thereof by clamps 70 and 72. The relationship of the clamp 70 with respect to the channel 60 is illustrated in FIG. 3 wherein it can be seen that upper and lower bolts 74 and 76 extend through a plate 78 and through the support arm 34.

In operation, the support arms 20 and 22 are adjustably secured to the beam 14 in the manner previously described and the manner of attaching the support arm to the beam permits the support arm to be moved along the length of the beam 14 to properly position the assembly with respect to the plow and to permit the assembly to be attached to various types of plows. The support arms 34 and 40 may be raised or lowered with respect to the support arms 20 and 22 by simply inserting the bolts 38 and 42 through different openings in the support arms 34 and 40 to permit the depth of penetration of the teeth 68 to be varied and to permit the assembly to compensate for varying heights of different makes of plows. The compression springs 50 and 58 normally urge the support arms 34 and 40 to pivot forwardly with respect to the support arms 20 and 22 to the position illustrated in FIG. 4. A stop means 80 is secured to the rearward end of support arm 20 and is in the pivotal path of support arm 34 so that the support arm 34 will not pivot forwardly of the vertical plane illustrated in FIG. 4. Likewise, a similar stop means is provided on the support arm 22. The compression springs 50 and 58 apply pressure to the support arms 34 and 40 so that the teeth 68 will penetrate the soil to a sufficient depth and to a depth which is greater than that possible by any of the prior or conventional devices to efficiently mulch the soil. The relationship of the teeth 68 to the soil is illustrated in FIG. 3 and it can be seen that the spring means does yieldably urge the teeth into a ground engaging condition. If the teeth 68 or any portion of the support arms 34 and 40 should engage a foreign object such as a rock or the like, the support arms 34 and 40 will pivot upwardly and rearwardly over the foreign object to prevent damage to the assembly 10 or the plow 12. The fact that the channel 60 is disposed at a 45° angle with respect to the direction of travel of the plow insures that the teeth 68 will slice through the plow furrows at a 45° angle instead of paralleling a continuous unbroken furrow which results in a more efficient and effective mulching of the soil.

The channel 60 may be adjustably secured with respect to the support arms 34 and 40 but it is preferred that approximately six teeth 38 be positioned to the right of support arm 34 as viewed in FIG. 2 with five of the teeth 68 being positioned to the left of support arms 40 although FIG. 2 does not illustrate such a relationship. It is also preferred that the teeth 68 be spaced apart on 5½inch centers with the outermost teeth 68 being spaced inwardly from the opposite ends of the channel 60 approximately 7 inches. It is also preferred that the teeth 68 extend approximately 12 inches below the lower flange 64 of the channel 60. When it is desired to increase the depth of penetration of the teeth 68, the adjustment bolts 46 and 56 may be tightened to increase the tension in the springs 50 and 58 which will supply greater pressure to the support arms 34 and 40 so that the teeth will be urged to a greater depth in the soil.

Thus it can be seen that an extremely versatile and efficient mulcher bar assembly has been described which may be attached to a variety of different plows and which may be adjusted with respect thereto so that the mulcher bar will be properly positioned with respect to the plow. It can also be seen that a mulcher bar assembly has been described which insures that the teeth thereof will penetrate the soil to a sufficient depth so that the soil will be properly mulched without relying on the inherent weight of the assembly itself to accomplish the same. Thus it can be seen that the device accomplishes at least all of its stated objectives.

I claim:

1. A mulcher bar assembly in combination with a plow adapted to be connected to a vehicle for movement in predetermined direction, said plow having a plurality of bottoms and a beam positioned above said bottoms, said mulcher bar assembly comprising:

at least two spaced apart parallel first support arms detachably rigidly secured at their forward ends to said beam and extending approximately horizontally rearwardly therefrom;

at least two parallel spaced apart second support arms, each of said second support arms being pivotally secured at its upper end to the rearward end of one of said first support arms; said second support arms having lower ends below said upper ends, the pivotal axes of said upper ends being oblique with respect to said predetermined directional movement of said plow and being above and to one side of said bottoms of said plow;

an elongated bar rigidly secured to and extending between said lower ends of said second support arms;

a single row of a plurality of spaced apart straight teeth rigidly secured to said bar and extending downwardly therefrom in a plane parallel to said second support arms;

spring means interconnecting said lower ends of said second support arms with said first support arms so as to yieldably urge said lower ends of said second support arms forwardly;

stop means on said first support arms for engaging said second support arms for limiting their forward swinging movement beyond a forward position, said second arms and said second support arms being swingable rearwardly against the bias of said springs to a rearward position wherein said teeth are disposed obliquely with respect to vertical and obliquely with respect to said predetermined directional movement of said plow when in a groundworking position.

2. A mulcher bar according to claim 1 wherein said pivotal axes of said upper ends of said second support arms extend along a line disposed at approximately 45° with respect to said predetermined direction of said plow.

3. The assembly of claim 1 wherein said first support arms are selectively adjustable secured to said beam so that said bar may be moved laterally forwardly and laterally rearwardly with respect to said bottoms.

4. The assembly of claim 1 wherein said bar is selectively adjustably secured to said second support arms so that said bar can be moved with respect to its own longitudinal axis.

5. The assembly of claim 1 wherein said upper ends of said second arms are selectively vertically adjustable in their pivotal connection to said first support arms so as to permit variation of the depth of soil penetration of said teeth.

6. The assembly of claim 1 wherein each of said spring means has a forward and a rearward end, an adjustment bolt being secured to said forward end, said adjustment bolt being adjustably secured to one of said first support arms to permit selective adjustment of tension in said spring means.

7. The assembly of claim 1 wherein said bar is comprised of an elongated channel member having upper and lower flanges joined by a base portion, said lower flange having a plurality of spaced apart openings formed therein, said teeth being received at their upper ends in said openings, said teeth being welded to said lower flange.